June 12, 1928.
J. C. CHAPMAN
1,673,762
SLACK ADJUSTER FOR SILENT CHAIN DRIVES
Filed June 14, 1926
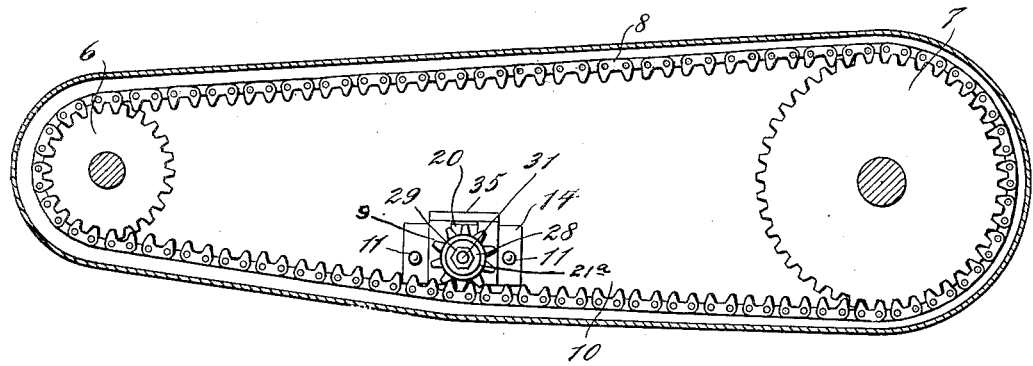
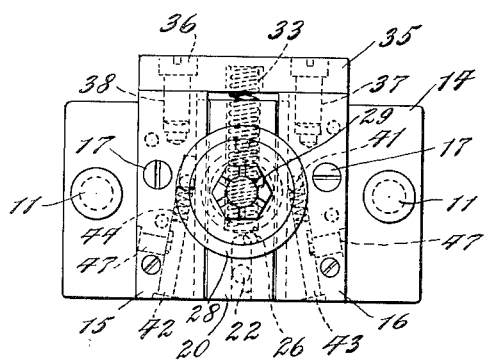
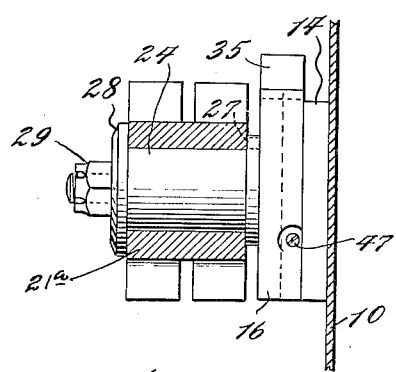
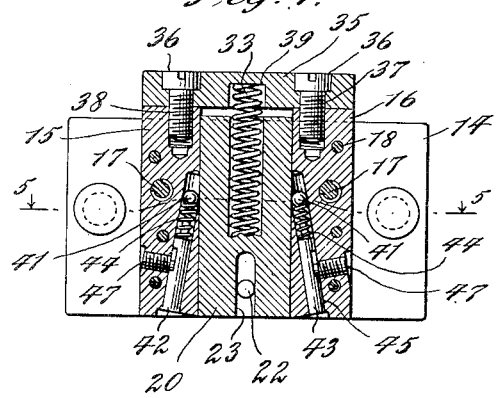
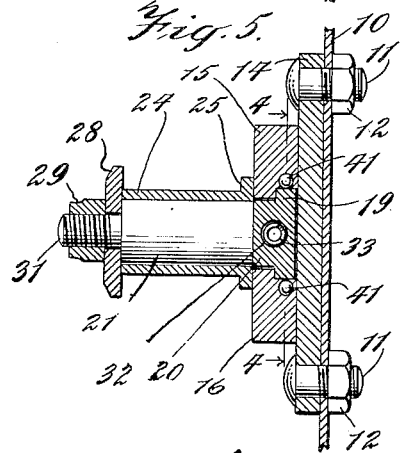
INVENTOR.
John C. Chapman.
BY
Gifford & Scull
His ATTORNEYS.

Patented June 12, 1928.

1,673,762

UNITED STATES PATENT OFFICE.

JOHN C. CHAPMAN, OF HARTFORD, CONNECTICUT, ASSIGNOR TO THE WHITNEY MFG. COMPANY, OF HARTFORD, CONNECTICUT, A CORPORATION OF CONNECTICUT.

SLACK ADJUSTER FOR SILENT CHAIN DRIVES.

Application filed June 14, 1926. Serial No. 115,704.

This invention relates to chain tightening mechanism and particularly to an automatic type of such mechanism. In the illustrated form it is shown as applied to a chain between two sprockets such as are used with a chain belt to connect the crank shaft and cam shaft of an automobile, but it is not limited to such use.

In the use of a chain for connecting rotating shafts it has been found that considerable vibration or whipping of the belt occurs. The object of the present invention is to insure a smooth running driving chain. A further object is to prevent this whipping or cross oscillation or surging of the belt which might result in noise and damage to the chain and the throwing or spattering of lubricating oil.

One of the prime considerations in a chain drive for automobiles is the absence of noise; another is compactness and a third is a fine adjustment in the device for taking up the slack of the chain due to wear.

Heretofore ratchets have been employed with adjusters but these are objectionable under present conditions in the automobile field, because considerable slack in the chain is necessary in order to permit the pawl to move from one tooth of the ratchet to another. During all this time there is considerable slack in the chain with its resultant noise and other objections.

I have devised a mechanism which constantly takes up the slack and as constantly acts to prevent any movement of the tightening means in a slackening direction.

The invention will be better understood by reading the following description in connection with the accompanying drawings showing an embodiment of my invention:

Fig. 1 is a diagrammatic elevation of a driving chain with the adjuster of my invention applied thereto;

Fig. 2 is an elevation of the adjuster of my invention free of its support;

Fig. 3 is a side elevation of Fig. 2;

Fig. 4 is a cross section on the line 4—4 of Fig. 5 showing the working details; and Fig. 5 is a cross section on line 5—5 of Fig. 4.

Like reference numerals refer to like parts in the specification and drawings.

The sprockets 6 and 7 are connected by any suitable belt or chain drive 8 illustrated here as a builtup chain of the silent link type. This chain is held tightened between its supports by the adjuster 9 of my invention, as will be further explained. The adjuster 9 is bolted to a support 10, such as the frame of the car, by suitable bolts 11 and nuts 12. These bolts pass through and fasten the base plate 14 to the support. Slide caps or guides 15 and 16 are fastened to the base plate 14 by screws 17 and dowels 18. The slide caps 15 and 16 are furnished with grooved guideways 19 to retain a slide bar 20 therebetween. The slide bar 20 carries a stub shaft or axle 21 for the support of a sprocket $21^a$, to engage with and travel on the chain 8 to hold it taut. The sprocket may be provided with a plain surface if a flat belt is used or it may have any suitable teeth or other construction to accommodate itself to any desired type of driving chain or other driving means. The downward movement of the slide bar 20 is limited by a peg or stop 22 suitably fastened to the base 14 and adapted to engage under the slot 23 to determine the extent of its downward movement.

A suitable bushing 24, such as bronze, is provided on the stub shaft or axle 21 to carry and furnish a bearing surface for the wheel. The bushing is provided in its face with a slot for suitable lubrication of the surfaces which are in rolling contact. Integral with the bushing 24 is a flange 25 which laps over the slide caps 15 and 16. This flange 25 is provided with notches 26 to engage suitable dowels 27 which are rigid with the slide bar 20 and prevent rotation of the bushing 24 relatively thereto. A suitable washer 28 and nut 29 retain the bushing in place on the stud or stub shaft and also retain in place the wheel which is to engage the belt or chain 8. A suitable cotter pin or other device may be used to retain the nut 29 in suitable relationship with the reduced threaded end 31 of the stud or shaft 21.

A bore 32 is provided in the slide bar 20 for housing a spring 33. This spring 33 furnishes a normal bias downwardly or tendency toward downward movement of the slide bar 20 and its associated axle 21. By means of this spring 33 the belt or chain is maintained taut through the wheel which bears against the surface of the chain or belt 8. The spring 33 is maintained under compression by means of an end or cap bar 35 fastened by screws 36 to the slide caps 15 and 16. The screws 36 engage suitable threaded sockets 37 and 38 in the slide caps 15 and 16 to retain the bar 35 abutted thereagainst. A socket 39 is provided in the bar 35 to position the end of the spring 33 relatively to the bar 35 and retain these parts in associated relationship when the slide bar 20 is forced downwardly.

The surge resisting features of this invention are constructed or formed within the slide caps 15 and 16. These consist of hardened metallic balls 41 fitted within drilled cylindrical openings or passageways 42 and 43. The cylindrical passageways are positioned in the slide caps so as to communicate with slideways 19 and at a slight angle thereto. The balls are spring pressed by means of suitable helical springs 44 so as to bear with force against the sides of the slide bar 20. The springs are adjustably retained in any desired degree of tension against the balls 41 by rods 45 which are retained in selected positions within the holes 42 and 43 by means of set screws 47.

The operation of my device is as follows: The spring 33 forces the stud axle 21 downwardly and carries with it the wheel which is rotatably mounted thereon and bears against the chain and exerts a pressure thereagainst. This pressure takes up the slack of the chain and furnishes thereby a smooth running chain against the sprockets 6 and 7. Without my device the chain or belt would have a tendency to whip or surge and for various reasons this is undesirable. This is prevented by the use of my invention as the spring 33 keeps a constant pressure on the chain and the balls 41 prevent any upward movement of the slide bar 20 by jamming between the slide caps or guides and the slide bar 20. The balls 41 prevent any upward movement of the slide bar 20, but very freely permit a downward movement thereof. Therefore, any slackness of the chain due to wear or other cause is quickly taken up. The action of the balls is such that all the slack is taken up instantly and the slide bar is prevented from moving upward at any time. The chain therefore runs quietly at all times.

The various parts of the device are so constructed that there is a nice fit between the slide bar 20 and the guides so that a very fine adjustment is maintained on the chain.

While I have illustrated balls to prevent upward movement of the slide bar, it is apparent that rollers or other equivalent means may be used. I have also illustrated guides separate from the base, but wish it to be understood that the guides may be integral with the base if desired.

Many other changes in details may be made without departing from the spirit of my invention.

I claim:

1. In a chain adjuster, the combination of a base, a slide member mounted on said base, a sprocket shaft mounted on said slide member and wedging means in engagement with said slide member and said base and acting automatically to prevent movement of said slide member in one direction.

2. In a chain adjuster, the combination of a base, a member slidably mounted on said base, guides for said slide member, a spring for moving said slide member in a direction to tighten the chain and wedging means engaging said slide member and said guides to prevent movement of said slide member to slacken said chain.

3. A chain or belt adjuster comprising a base, guides thereon, a slide bar reciprocably mounted between said guides, means tending to press said bar to outward position, and wedging means for resisting and checking the movement of said bar in opposition to said last-mentioned means.

4. A chain or belt adjuster including a slide element, means giving said slide element a normal bias in one direction, and balls mounted to grip said element to prevent movement in the opposite direction.

5. A chain or belt adjuster including a slide element, means giving said slide element a normal bias in one direction, and balls mounted to grip said element when initiating a movement in the opposite direction to stop said movement.

6. A slack adjuster for belts including a base, slide bar guides on said base, a slide bar reciprocably mounted between said guides, a spring forcing said slide bar in one direction, a bore in each of said guides obliquely intersecting the guideway, a ball in each of said bores, a spring normally biasing said balls toward the guideway into contact with the guide surfaces of said slide bar under pressure, whereby movement of said guide bar in one direction is resisted by the pinching of said balls against the walls of their respective bores.

JOHN C. CHAPMAN.